United States Patent
Wu et al.

(10) Patent No.: US 9,233,704 B2
(45) Date of Patent: Jan. 12, 2016

(54) JOGGING STROLLER FRAME WITH A FRONT WHEEL AUTOMATIC FLATTENING FOLDING MECHANISM

(71) Applicant: LERADO (ZHONG SHAN) INDUSTRIAL CO., LTD., Zhong Shan, Guang Dong Province (CN)

(72) Inventors: Tse-Chien Wu, Kaohsiung (TW); Yung-Shuen Lin, Taibao (TW); Shan-Heng Lin, Chiayi County (TW)

(73) Assignee: DOREL JUVENILE (ZHONGSHAN) PRODUCT CO., LTD., Guang Dong (CN)

( * ) Notice: Subject to any disclaimer, the term of this patent is extended or adjusted under 35 U.S.C. 154(b) by 0 days.

(21) Appl. No.: 14/482,537

(22) Filed: Sep. 10, 2014

(65) Prior Publication Data

US 2015/0076776 A1 Mar. 19, 2015

(30) Foreign Application Priority Data

Sep. 13, 2013 (CN) ...................... 2013 2 0566975 U

(51) Int. Cl.
  *B62B 1/00* (2006.01)
  *B62B 7/08* (2006.01)
  *B62B 7/04* (2006.01)
  *B62B 7/14* (2006.01)
(52) U.S. Cl.
  CPC ............. *B62B 7/083* (2013.01); *B62B 7/044* (2013.01); *B62B 7/145* (2013.01)

(58) Field of Classification Search
  CPC ............ B62B 1/00; B62B 7/083; B62B 7/044
  USPC .......... 280/642, 643, 648, 650, 47.38, 30, 38, 280/47.34
  See application file for complete search history.

(56) References Cited

U.S. PATENT DOCUMENTS

| | | | | |
|---|---|---|---|---|
| 4,832,354 A | * | 5/1989 | LaFreniere | 280/30 |
| 5,290,049 A | * | 3/1994 | Crisp et al. | 280/30 |
| 6,105,998 A | * | 8/2000 | Baechler et al. | 280/650 |
| 6,152,476 A | * | 11/2000 | Huang | 280/642 |
| 6,722,690 B2 | * | 4/2004 | Lan | 280/642 |
| 7,032,922 B1 | * | 4/2006 | Lan | 280/648 |
| 7,568,721 B2 | * | 8/2009 | Huang | 280/642 |
| 8,328,226 B2 | * | 12/2012 | Xu-Hui et al. | 280/643 |
| 8,480,116 B2 | * | 7/2013 | Li | 280/643 |
| 2007/0045055 A1 | * | 3/2007 | Lan | 188/20 |
| 2010/0109293 A1 | * | 5/2010 | Friisdahl et al. | 280/643 |

* cited by examiner

*Primary Examiner* — Hau Phan
(74) *Attorney, Agent, or Firm* — Muncy, Geissler, Olds & Lowe, P.C.

(57) ABSTRACT

A jogging stroller frame with a front wheel automatic flattening folding mechanism is provided with a jogging stroller frame which can be folded into a substantially flattened configuration for compact storage by an associating of a linking rod. When the foldable jogging stroller frame is folded into the substantially flattened configuration, the seat support rack shall pull the front wheel set to rotate backward about a horizontal axis to the pair of rear struts through the linking rod, thereby converting the foldable jogging stroller frame into a successively smaller size for more compact storage.

8 Claims, 6 Drawing Sheets

JOGGING STROLLER FRAME WITH A FRONT WHEEL AUTOMATIC FLATTENING FOLDING MECHANISM

BACKGROUND OF THE INVENTION

1. Field of the Invention

The present invention relates to a jogging stroller frame, especially to a jogging stroller frame provided with a front wheel automatic flattening folding mechanism for rotating the front wheel set rearward about a horizontal axis to the rear strut thereof when a user is folding the jogging stroller frame into a substantially flattened configuration.

2. Description of the Related Art

Jogging strollers are generally formed of lightweight tubular frame members with three sixteen (16) inches large wheels for facilitating the transportation of a child occupant seated therein by a fast walking exercise of a care-giver.

Traditional jogging stroller has a foldable frame can be erected in an erected configuration and converted into a generally flattened configuration for storage. As the diameter of the wheels are too big and occupied at least sixteen (16) in longitudinal dimension, shall make the user unavoidably needs to pull off the wheels from the frame to get a successively smaller size for compact storage.

SUMMARY OF THE INVENTION

For eliminating the trouble to the user of pulling off the wheels from the jogging stroller frame for merely getting a successively smaller size for compact storage, the present invention provides a jogging stroller frame with a front wheel automatic flattening folding mechanism. The foldable jogging stroller frame is provided with a front strut, a pair of rear struts, a pair of push arms pivoted with the pair of rear struts, a seat support rack pivoted between the front strut and the pair of rear struts, a pair of lockable joints lockably and pivotally connected between the front strut and the pair of rear struts, a front wheel set pivotally connected to the front strut for rotating backward about a horizontal axis, and a linking rod associated between the front wheel set and the seat support rack.

The lockable joints can be locked and kept the foldable jogging stroller frame in an erected configuration for transporting an occupant, and unlocked to permit the foldable jogging stroller frame to be folded into a substantially flattened configuration for storage.

The front wheel set is featured with having pivotally connected to the front strut for rotating backward about the horizontal axis and the linking rod is associated between the front wheel set and the seat support rack, such that when the foldable jogging stroller frame is folded into a substantially flattened configuration, the seat support rack shall pull the front wheel set to rotate backward about said horizontal axis to the pair of rear struts through the linking rod for converting the foldable jogging stroller frame into a successively smaller size for compact storage.

In one embodiment, the pair of push arms is provided with two lugs for pivotally connected with the pair of rear struts. When the pair of lockable joints is unlocked, shall permit the user to press on the rear end of the pair of push arms downward to make the pair of push arms pivoting on the two lugs as a fulcrum of a labor-saving level, by this way to lift the pair of lockable joints, front strut as well as the seat support rack move upward and rotate to the pair of rear struts, and make the seat support rack to pull the front wheel set rotate backward to the pair of rear struts through the rotation of the linking rod at the same time. In one embodiment, the linking rod is formed with a transversal section for pivoting to the both sides of the seat support rack.

BRIEF DESCRIPTION OF THE DRAWINGS

The accompanying drawings, which are included to provide a further understanding of the invention are incorporated in and constitute a part of this specification, illustrate embodiments of the invention and together with the description serve to explain the principles of the invention. In the drawings.

DETAILED DESCRIPTION OF THE PREFERRED EMBODIMENTS

Figure 1:
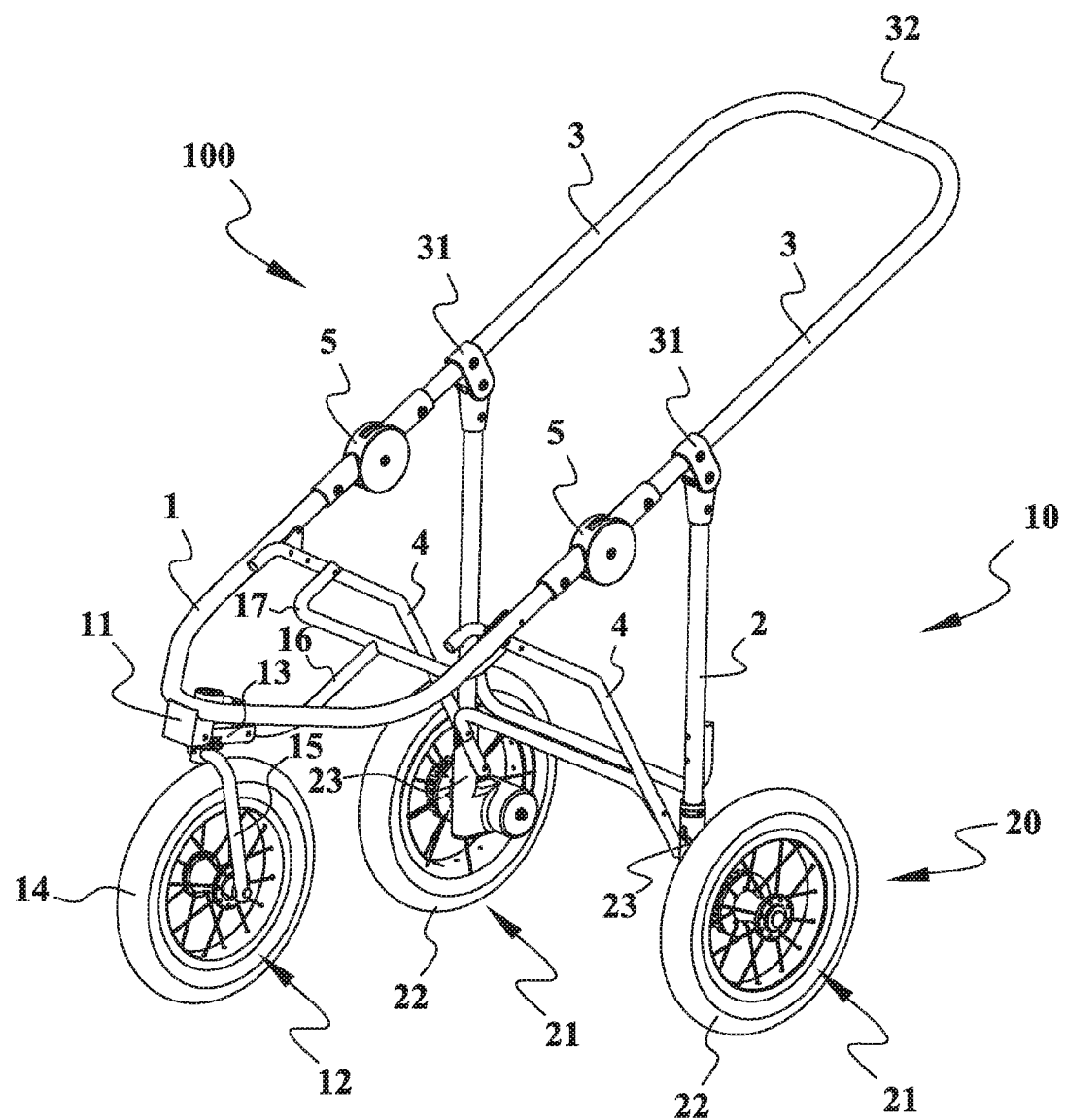
FIG. 1 is a perspective view of the jogging stroller frame with a front wheel automatic flattening folding mechanism according to the present invention.
Figure 2:
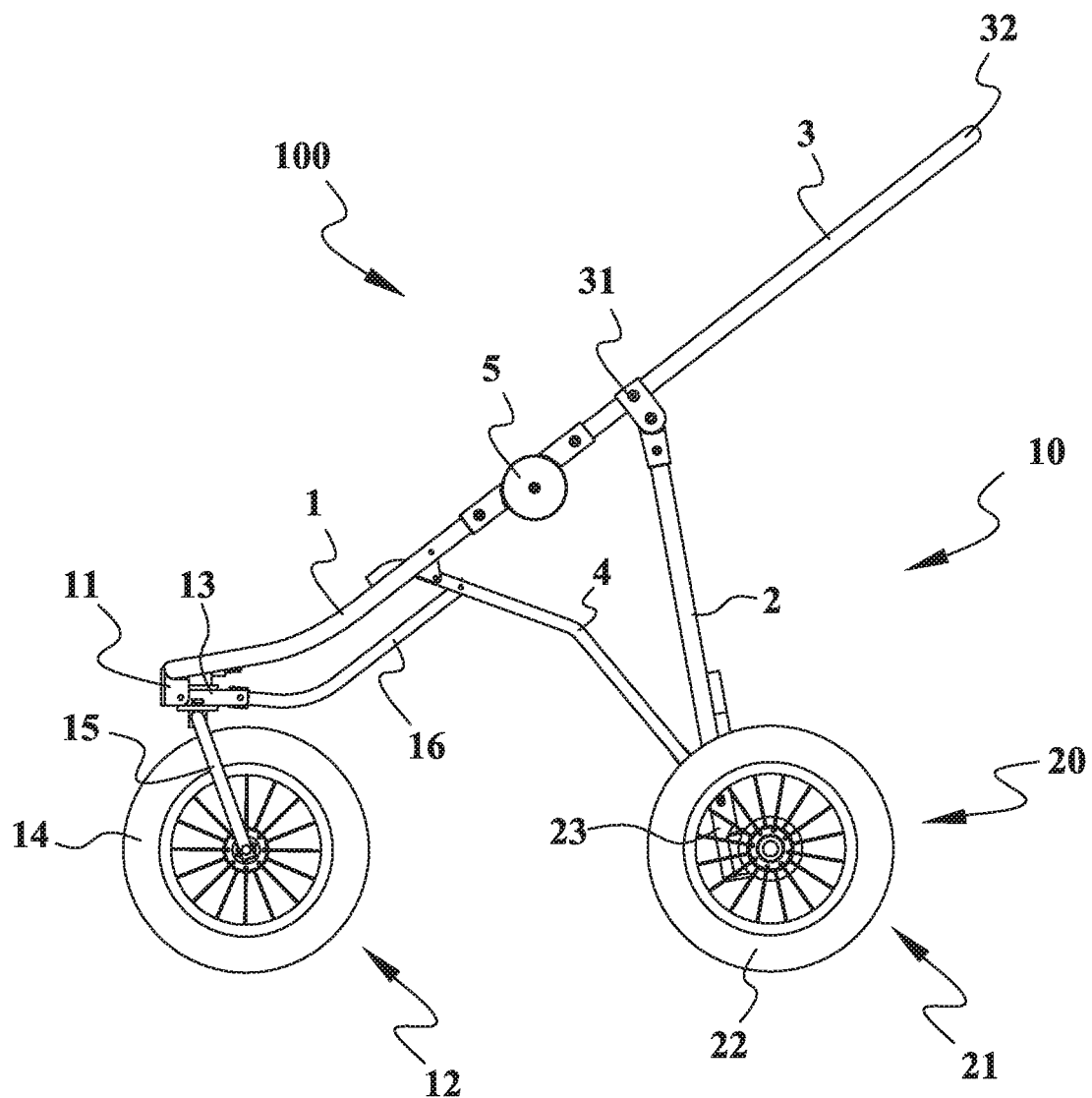
FIG. 2 is a side elevation view of the jogging stroller frame with a front wheel automatic flattening folding mechanism of FIG. 1.
Figure 3:
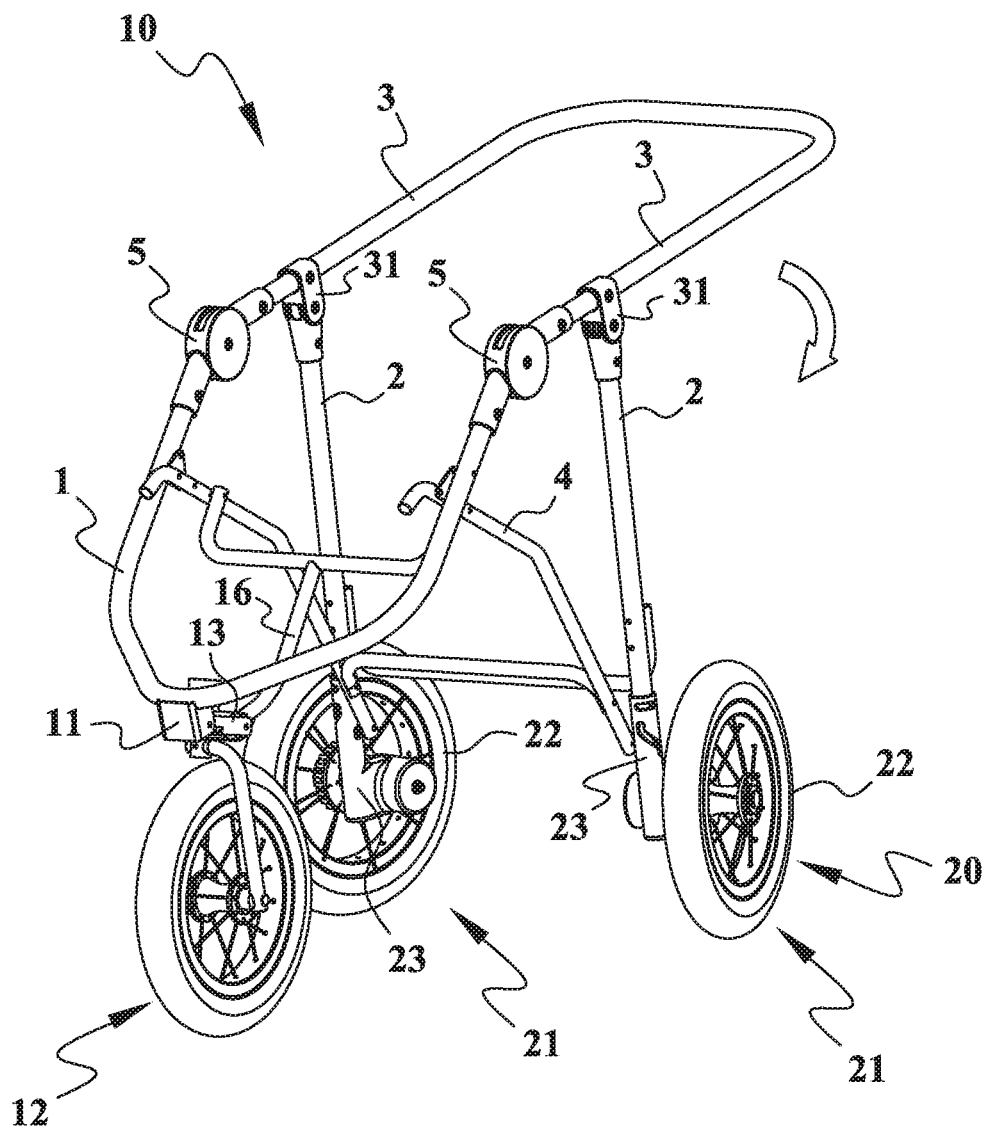
FIG. 3 is a perspective view schematically showing an operation of the push arms working as a labor-saving level to fold the jogging stroller frame.

Referring to FIGS. 1 and 2, the jogging stroller frame with a front wheel automatic flattening folding mechanism according to the present invention includes a foldable jogging stroller frame 10, a front wheel set 12 and a linking rod 16.

The foldable jogging stroller frame 10 has a front strut 1, a pair of rear struts 2, a pair of push arms 3 pivoted with the pair of rear struts 2, a seat support rack 4 pivoted between the front strut 1 and the pair of rear struts 2, and a pair of lockable joints 5 lockably and pivotally connected between the front strut 1 and the pair of rear struts 2.

The lockable joints 5 can be locked and kept the foldable jogging stroller frame 10 in an erected configuration 100 for transporting an occupant, and unlocked to permit the foldable jogging stroller frame 10 to be folded into a substantially flattened configuration 200 for storage.

The front wheel set 12 is featured with having pivotally connected to the front strut 1 for rotating backward about a horizontal axis (not shown).

The linking rod 16 is associated between the front wheel set 12 and the seat support rack 4, such that when the foldable jogging stroller frame 10 is folded into a substantially flattened configuration 200, the seat support rack 4 shall pull the front wheel set 12 to rotate backward about said horizontal axis to the pair of rear struts 2 through the association of the linking rod 16 thereby converting the foldable jogging stroller frame 10 into a subsequently smaller size for more compact storage.

In one embodiment, the pair of push arms 3 is provided with two lugs 31 for pivotally connected with the pair of rear struts 2. By this assembly design, when the pair of lockable joints 5 is unlocked, shall permit the user to press on the rear end of the pair of push arms 3 downward thereby making the pair of push arms 3 to pivot on the two lugs 31 as a fulcrum of a labor-saving level and lift the pair of lockable joints 5, front strut 1 as well as the seat support rack 4 to move upward and rotate to the pair of rear struts 2, and make the seat support rack 4 to pull the front wheel set 12 to rotate backward to the pair of rear struts 2 through the rotation of the linking rod 16 at the same time. An embodiment as best shown in FIG. 1, the linking rod 16 is formed with a transversal section 17 for pivoting to the both sides of the seat support rack 4.

Preferably, the pair of push arms 3 is provided a horizontal cross-bar handle 32 for the user to control and press on it downward for easy folding of the foldable jogging stroller frame 10, so as to make the pair of push arms 3 pivoting on the two lugs 31 as a fulcrum of a labor-saving level and lift the pair of lockable joints 5, front strut 1 and the seat support rack 4 to move upward and rotate to the pair of rear struts 2, as well as to make the seat support rack 4 pulling the front wheel set 12 to rotate backward to the pair of rear struts 2 through the linking rod 16 at the same time.

Specifically, the front wheel set 12 may include a front wheel mount 13, a front wheel 14 and a wheel connecting arm 15 connected between the front wheel mount 13 and the front wheel 14. The front wheel mount 13 is pivotally connected to the front strut 1 and permitted to rotate backward toward the pair of rear struts 2 about a horizontal axis (not shown). The wheel connecting arm 15 is lockably and swivelably connected with the front wheel mount 13 thereby permitting the front wheel 14 to rotate an angle for further closing to the pair of rear struts 2, so as to convert the foldable jogging stroller frame 10 into a successively smaller size for compact storage.

Preferably, the front strut 10 may be equipped with a horizontal pivot mount 11 at its front end for pivoting the front wheel mount 13 and permitting the front wheel set 12 to rotate toward the pair of rear struts 2 about a horizontal axis. In this embodiment, when the foldable jogging stroller frame 10 is folded into the substantially flattened configuration 200, the front wheel set 12 can either be kept in its original longitudinal travel direction as shown in FIG. 6, or be rotated into a transversal direction as shown in FIGS. 4 to 5.

Figure 4:
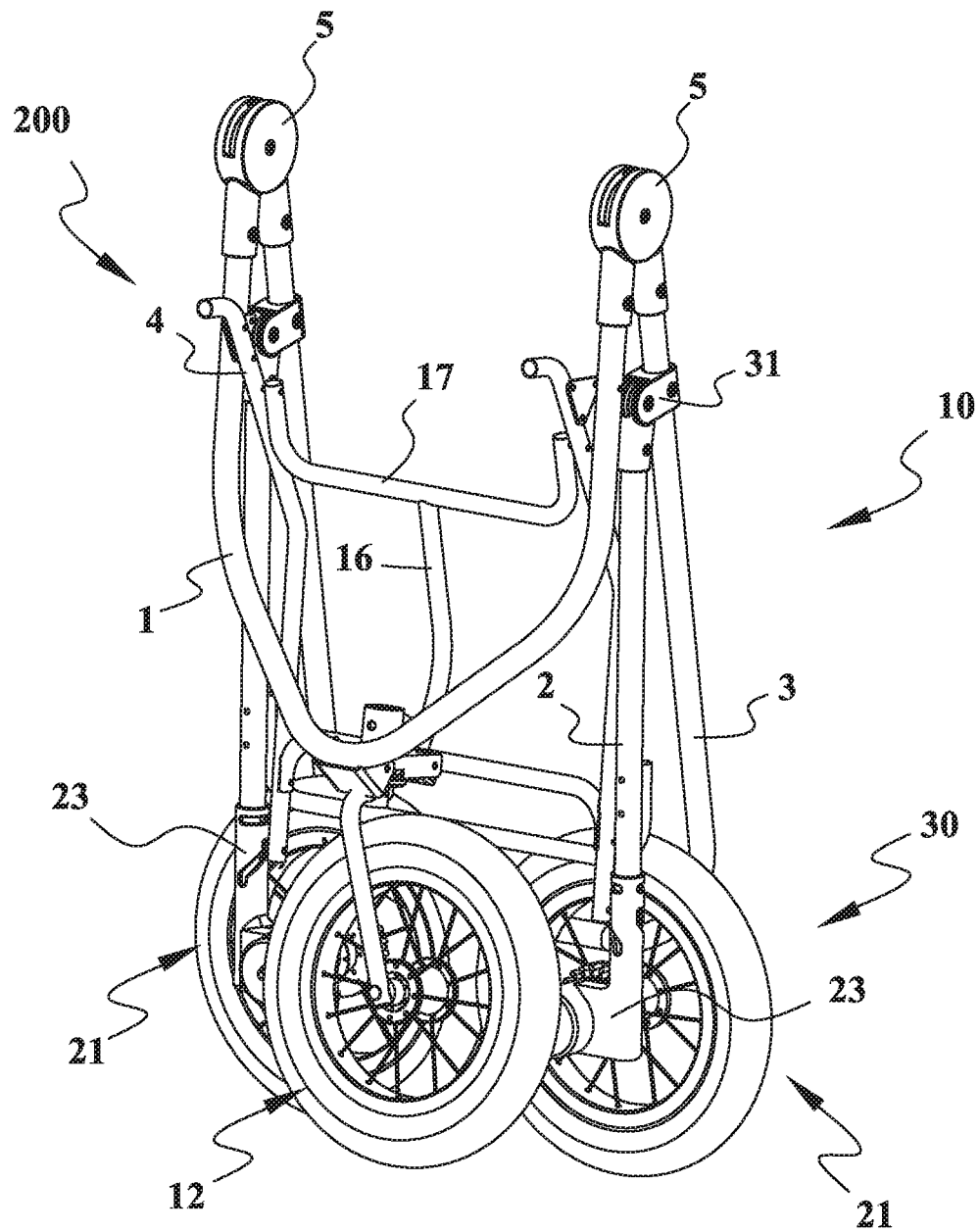
FIG. 4 is a perspective view schematically showing the jogging stroller frame in a substantially flattened configuration.
Figure 5:
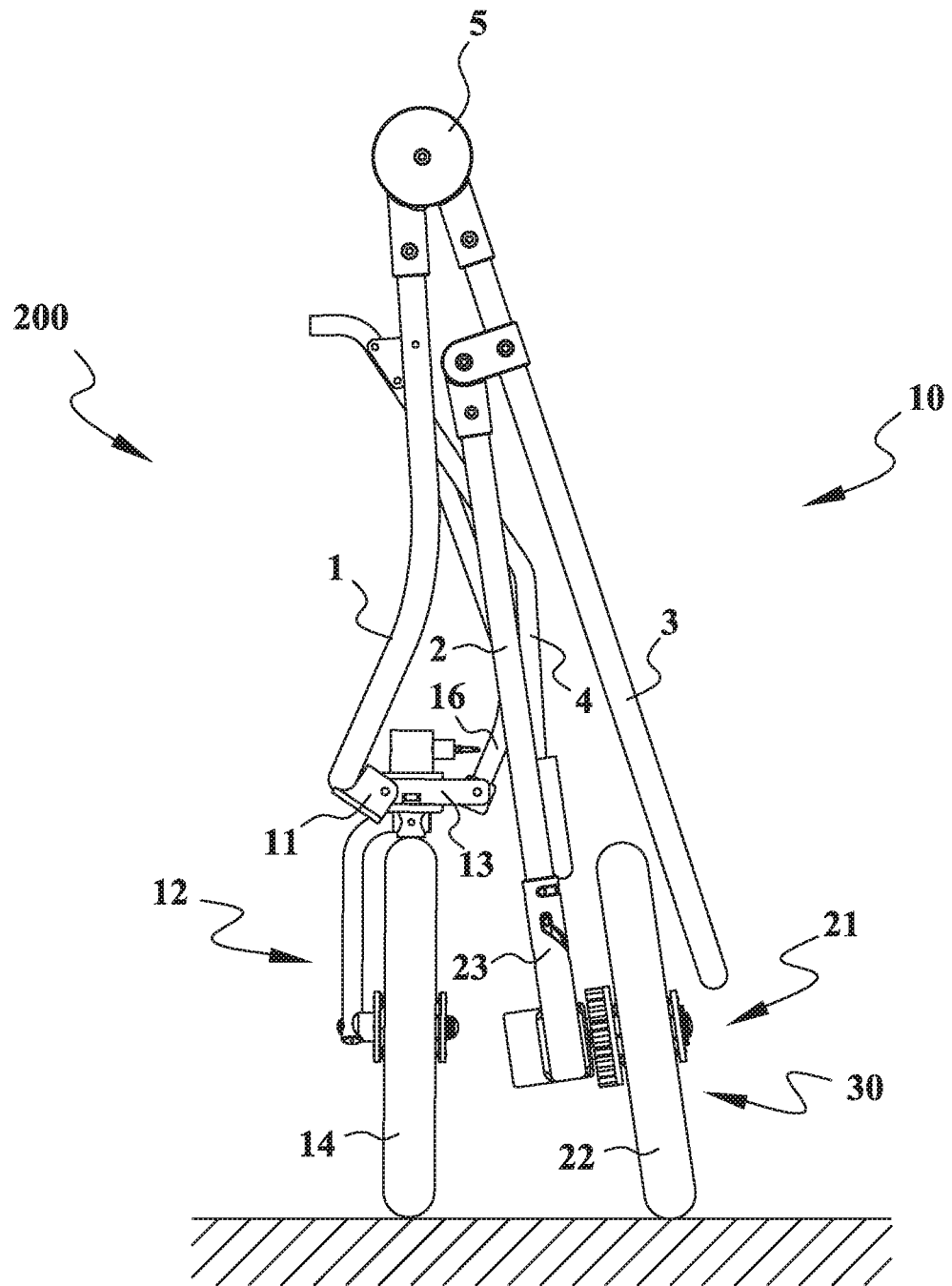
FIG. 5 is a side elevation view schematically showing the jogging stroller frame in a substantially flattened configuration.
Figure 6:
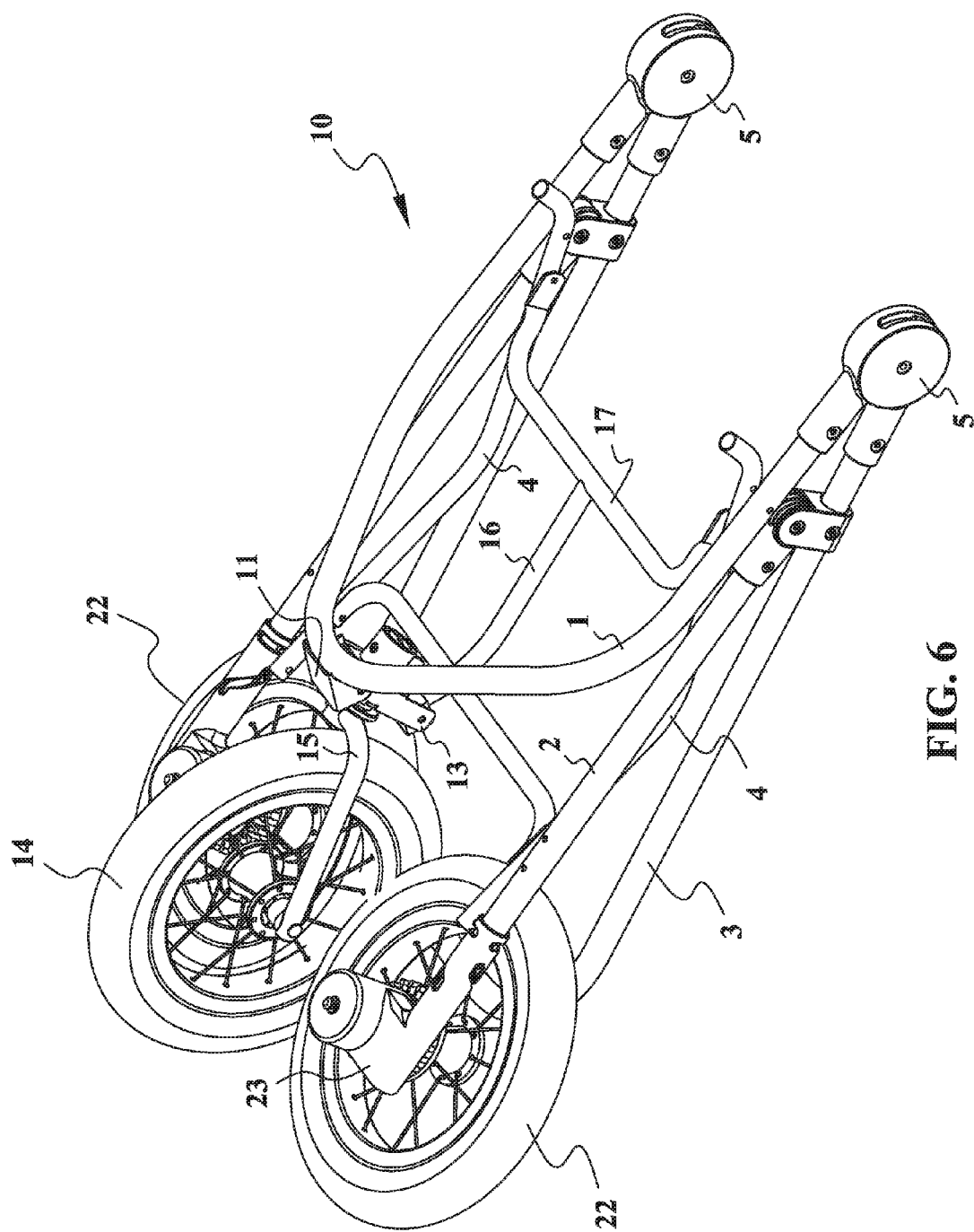
FIG. 6 is a perspective view schematically showing the jogging stroller frame in another substantially flattened configuration.

As best shown in FIGS. 3 to 6, the pair of rear struts 2 each is swivelably connected a rear wheel set 21 at the lower end. The rear wheel sets 21 each includes a wheel mount 23 for connecting a rear wheel 22 on one side thereof and can be locked in a longitudinal travel direction 20 and a transversal direction 30 as shown in FIGS. 4 to 6. In this embodiment, the linking rod 16 is associated between front strut 1 and the rear wheel set 21, and when the pair of lockable joints 5 is unlocked, the rotation of the front strut 1 shall drive the rear wheel set 21 to rotate from the longitudinal travel direction 20 about 90 degrees to the transversal direction 30. By this way, the foldable jogging stroller frame 10 is to be folded into a successively smaller size for compact storage in the substantially flattened configuration 200.

While particular embodiments of the invention have been described, those skilled in the art will recognize that many modifications are possible that will achieve the same goals by substantially the same system, device or method, and where those systems, devices or methods still fall within the true spirit and scope of the invention disclosed.

What is claimed is:

1. A jogging stroller frame with a front wheel automatic flattening folding mechanism, including:
    a foldable jogging stroller frame (10), having a front strut (1), a pair of rear struts (2), a pair of push arms (3) pivoted with the pair of rear struts (2), a seat support rack (4) pivoted between the front strut (1) and the pair of rear struts (2), and a pair of lockable joints (5) lockably and pivotally connected between the front strut (1) and the pair of rear struts (2); the lockable joints (5) can be locked to keep the foldable jogging stroller frame (10) in an erected configuration (100) for transporting an occupant supported by the seat support rack (4), and unlocked to permit the foldable jogging stroller frame (10) to be folded into a substantially flattened configuration (200) for storage;
    a front wheel set (12) pivotally connected to the front strut (1) for rotating backward about a horizontal axis; and
    a linking rod (16) associated between the front wheel set (12) and the seat support rack (4); when the foldable jogging stroller frame (10) to be folded into the substantially flattened configuration (200), the seat support rack (4) shall pull the front wheel set (12) to rotate backward about a horizontal axis to the pair of rear struts (2) through the linking rod (16), thereby converting the foldable jogging stroller frame (10) into a successively smaller size for compact storage,
    wherein the pair of push arms (3) has two lugs (31) for pivotally connected with the pair of rear struts (2); when the pair of lockable joints (5) is unlocked, a user may press on the pair of push arms (3) downward such and make the pair of push arms (3) to pivot on the two lugs (31) as a fulcrum of a labor-saving level to lift the pair of lockable joints (5), front strut (1) and the seat support rack (4) moving upward and rotating to the pair of rear struts (2), and make the seat support rack (4) to pull the front wheel set (12) to rotate backward to the pair of rear struts (2) about the horizontal axis through the linking rod (16) at the same time.

2. The jogging stroller frame with a front wheel automatic flattening folding mechanism according to claim 1, wherein the seat support rack (4) pulls the front wheel set (12) to rotate rearward through the linking rod (16) by rotation.

3. The jogging stroller frame with a front wheel automatic flattening folding mechanism according to claim 1, wherein the front wheel set (12) including a front wheel mount (13), a front wheel (14) and a wheel connecting arm (15) connected between the front wheel mount (13) and the front wheel (14); the front wheel mount (13) being pivotally connected to the front strut (1) and permitted] to rotate backward toward the pair of rear struts (2) about a horizontal axis; the wheel connecting arm (15) being lockably and swivelably connected with the front wheel mount (13) thereby permitting the front wheel (14) to rotate an angle, so as to convert the foldable jogging stroller frame (10) into a successively smaller size for compact storage.

4. The jogging stroller frame with a front wheel automatic flattening folding mechanism according to claim 3, wherein the front strut (10) has a horizontal pivot mount (11) for pivoting the front wheel mount (13) thereby permitting the front wheel set (12) to rotate toward the pair of rear struts (2) about a horizontal axis of the horizontal pivot mount (11).

5. The jogging stroller frame with a front wheel automatic flattening folding mechanism according to claim 1, wherein the linking rod (16) is formed with a transversal section (17) for pivoting at the seat support rack (4).

6. The jogging stroller frame with a front wheel automatic flattening folding mechanism according to claim 1, wherein the pair of rear struts (2) each is swivelably connected a rear wheel set (21) at a lower end thereof; the rear wheel set (21) including a wheel mount (23) for connecting a rear wheel (22) on one side thereof.

7. The jogging stroller frame with a front wheel automatic flattening folding mechanism according to claim 6, wherein the linking rod (16) is associated between front strut (1) and the rear wheel set (21), and when the pair of lockable joints (5) is unlocked, the rotation of the front strut (1) shall drive the rear wheel set (21) to rotate about 90 degrees thereby permitting the foldable jogging stroller frame (10) to be folded into a successively smaller size for compact storage in the substantially flattened configuration (200).

8. The jogging stroller frame with a front wheel automatic flattening folding mechanism according to claim 1, wherein the pair of push arms (3) has a horizontal cross-bar handle (32) for the user to control and press on it downward to make the pair of push arms (3) pivoting on the two lugs (31) as a fulcrum of a labor-saving level, so as to lift the pair of lockable joints (5), front strut (1) and the seat support rack (4) to move upward and rotate to the pair of rear struts (2), and make the seat support rack (4) to pull the front wheel set (12) to rotate backward to the pair of rear struts (2) through the linking rod (16) at the same time.

* * * * *